(12) United States Patent
O'Kelley et al.

(10) Patent No.: US 10,735,336 B2
(45) Date of Patent: *Aug. 4, 2020

(54) SYSTEMS AND METHODS FOR REAL-TIME STRUCTURED OBJECT DATA AGGREGATION AND CONTROL LOOP FEEDBACK

(71) Applicant: AppNexus Inc., New York, NY (US)

(72) Inventors: Charles B. O'Kelley, New York, NY (US); Catherine M. Williams, New York, NY (US); Taylor E. Burmeister, New York, NY (US); Yaron Lissack, Great Neck, NY (US)

(73) Assignee: Xandr Inc., New York, NY (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/416,132

(22) Filed: Jan. 26, 2017

(65) Prior Publication Data
US 2017/0222940 A1    Aug. 3, 2017

Related U.S. Application Data

(60) Provisional application No. 62/289,062, filed on Jan. 29, 2016.

(51) Int. Cl.
*H04L 12/863* (2013.01)
*H04L 29/08* (2006.01)
*H04L 12/911* (2013.01)

(52) U.S. Cl.
CPC .............. *H04L 47/50* (2013.01); *H04L 47/70* (2013.01); *H04L 67/02* (2013.01)

(58) Field of Classification Search
CPC ....................................................... H04L 47/50
See application file for complete search history.

(56) References Cited

U.S. PATENT DOCUMENTS

| | | | | |
|---|---|---|---|---|
| 8,117,505 B2 * | 2/2012 | Sridharan | ............. | G06F 11/004 700/108 |
| 2007/0143186 A1 | 6/2007 | Apple et al. | | |
| 2014/0188840 A1 * | 7/2014 | Agarwal | ............. | G06F 16/2228 707/711 |
| 2017/0075693 A1 * | 3/2017 | Bishop | .................. | G06F 9/5088 |

* cited by examiner

*Primary Examiner* — Esther B. Henderson
(74) *Attorney, Agent, or Firm* — Guntin & Gust, PLC; Douglas Schnabel

(57) ABSTRACT

Systems and methods for real-time message processing and control loop feedback are described. A stream processing system includes (i) a publish/subscribe and message queueing subsystem and (ii) an execution subsystem. A real-time stream of transactions is received at the publish/subscribe and message queueing subsystem. A job is created to aggregate data from the real-time stream of transactions with data from one or more other streams received at the publish/subscribe and messaging queueing subsystem. The job is executed at the execution subsystem, and the aggregated data resulting from the execution of the job is received at the publish/subscribe and message queueing subsystem. At least a portion of the aggregated data is provided as input to a control loop feedback process, which is executed to generate a result.

19 Claims, 7 Drawing Sheets

SYSTEMS AND METHODS FOR REAL-TIME STRUCTURED OBJECT DATA AGGREGATION AND CONTROL LOOP FEEDBACK

CROSS-REFERENCE TO RELATED APPLICATION

This application claims priority to and the benefit of U.S. Provisional Patent Application 62/289,062, filed on Jan. 29, 2016, the entirety of which is incorporated by reference herein.

TECHNICAL FIELD

This disclosure relates generally to data processing and control algorithms and, more particularly, to a real-time message processing system and corresponding methods that provide input to control loop feedback algorithms.

BACKGROUND

Messaging systems can be used to implement substantially real-time asynchronous processing of events in a manner that is decoupled from processes that generate the events. To address various issues that arise with these systems, stream processing can be implemented on top of messaging systems as a higher-level layer of abstraction. For example, Apache Samza is one such stream processing framework that operates on streams of immutable messages of a similar type or category. These messages can be read from the streams by consumers, who can choose to take action in response to the messages. To date, existing stream processing systems have not yet reached maturity, resulting in the need to develop customized stream processing solutions to address the unique problems arising in certain large-scale data processors.

BRIEF SUMMARY

In one aspect, a computer-implemented method comprises providing a stream processing system comprising (i) a publish/subscribe and message queueing subsystem and (ii) an execution subsystem; receiving, at the publish/subscribe and message queueing subsystem, a real-time stream of transactions; creating a job to aggregate data from the real-time stream of transactions with data from one or more other streams received at the publish/subscribe and messaging queueing subsystem; executing the job at the execution subsystem and receiving the aggregated data resulting from the execution of the job at the publish/subscribe and message queueing subsystem; providing at least a portion of the aggregated data as input to a control loop feedback process; and executing the control loop feedback process using the input and generating a result from the execution. Other aspects of the foregoing include corresponding systems and computer-executable instructions stored on non-transitory storage media.

Various implementations of these aspects can include one or more of the following features. The publish/subscribe and message queueing subsystem comprises Apache KAFKA. The execution subsystem comprises Apache HADOOP YARN. Executing the control loop feedback process comprises executing the control loop feedback process at a first time to generate a result comprising a first target pace. Additional jobs are periodically created and executed to aggregate data received from the streams. The first target pace and at least a portion of the aggregated data from the additional jobs are provided as input to the control loop feedback process at a second, later time to generate a result comprising a second target pace. The second target pace is determined based at least in part on a time of day of the second time. The first target pace is applied during a first time period to determine a speed at which a resource will be exhausted.

In a further implementation, the following are determined: (i) an instant error between a target amount of resource exhaustion and an actual amount of resource exhaustion at a current time instance and (ii) an accumulative error between the target amount and the actual amount over a first time period. A second target pace can then be applied during a second, later time period based on the instant error at the current time instance and the accumulative error over the first time period to reduce an instant error between the target amount of resource exhaustion and an actual amount of resource exhaustion during the second time period.

The details of one or more implementations of the subject matter described in the present specification are set forth in the accompanying drawings and the description below. Other features, aspects, and advantages of the subject matter will become apparent from the description, the drawings, and the claims.

DETAILED DESCRIPTION

Figure 1:
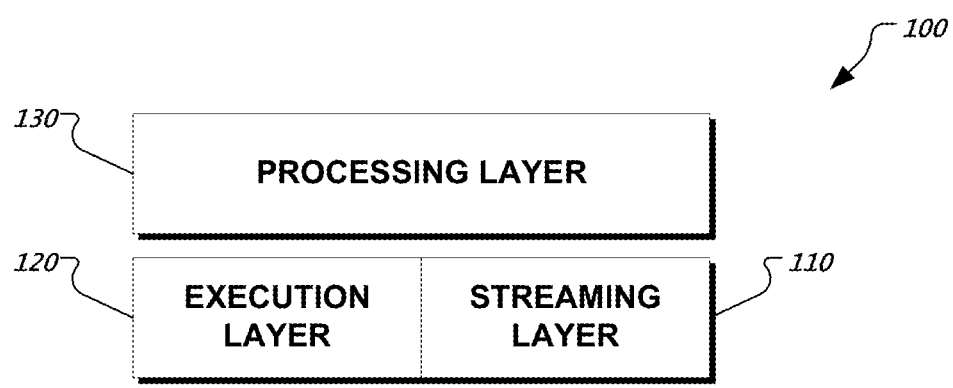
FIG. 1 depicts an example high-level system architecture claim for a stream processing system according to an implementation.

FIG. 1 depicts an example high-level stream processing architecture 100 according to one implementation. Stream processing architecture 100 includes streaming layer 110, execution layer 120, and processing layer 130. In one implementation, streaming layer 110 is a distributed publish/subscribe (pub/sub) and message queueing system, such as Apache Kafka™. For example, streaming layer 110 can provide at-least-once messaging guarantees to ensure no messages are lost when a fault occurs, and highly available partitions such that a stream's partitions continue to be available even when a machine fails. Execution layer 120 can include a cluster scheduler for allocating processes and executing jobs, such as Apache Hadoop® YARN (Yet Another Resource Negotiator). Processing layer 130 can include an application programming interface (API) that provides for communication among the layers of the stream processing architecture 100 and performs other tasks as described herein.

As in YARN, execution layer 120 can include a Resource Manager and a Node Manager. Individual machines each run a Node Manager, which is responsible for launching processes on that machine. The Resource Manager communicates with Node Managers to instruct them which jobs to execute. Processing layer 130 can be used to inform the Resource Manager when a new job is to be created. The Resource Manager instructs a Node Manager to allocate space on a cluster and execute the requested job.

Figure 2:
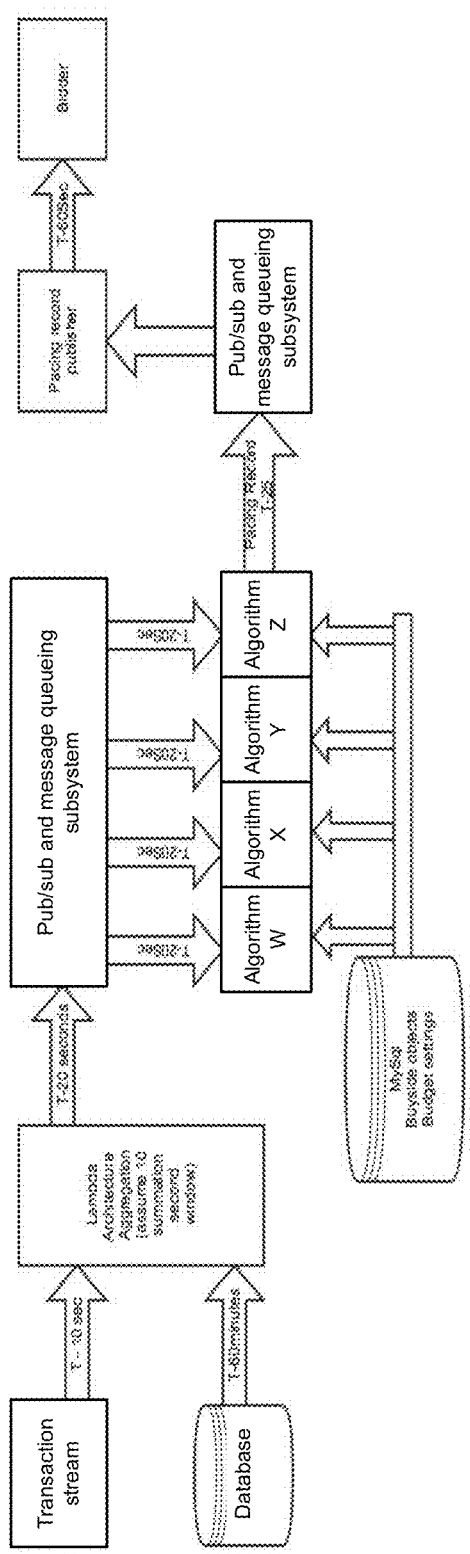
FIG. 2 depicts an example architecture of a system for real-time stream processing to provide data to a control loop feedback algorithm.

FIG. 2 depicts an example architecture of a system for real-time stream processing to provide data to a control loop feedback algorithm. The use of the stream processing architecture 100 in conjunction with this system provides advantages over existing computing systems that perform similar tasks using batch processing of transactions, which results in high latency. The present system instead lowers latency by processing real-time transaction streams (e.g., streams with data arriving in real-time or periodically in short periods, such as every 5 or 10 seconds), and aggregating the real-time data with data stored in high-volume, high-performance databases (e.g., made available through HPE Vertica). In one example, the control loop feedback algorithm includes a pacing control loop that varies auction bid values in accordance with a desired spending rate. The depicted system reduces latency in receiving input data to the pacing control loop (caused by minutes-long delays in updating bidder pacing parameters after receiving auction results) by having only a simple pacing control mechanism in bidders and locating more complex pacing logic into an external pacing subsystem. Accordingly, the time between auction win notification (identified as "T" in FIG. 2) and the application of a new pacing strategy by a bidder can be reduced to 60 seconds or less (T–60).

In some implementations, bidders are configured as software and/or hardware-based operators that execute bidding logic in online advertising auctions. Bidders can run on computing devices each having one or more processors and memories to store computer-executable instructions executable by the processor. A pacing strategy for a bidder can be specified by a pacing record, which is propagated by a pacing record publisher to the bidder. The pacing record can include a bid rate value that indicates a percentage of auctions on which to bid (e.g., a randomly determined number between 0 and 100, where 0 means bid on no auctions, and 100 means bid on all auctions). The pacing record can also specify that pacing should be performed based on an impression counter. For example, the record can specify that once a particular number of auctions is won by the bidder, no further bids should be made until a new pacing record is received.

Notably, although the present pacing controller system can be geographically distributed, with various data centers located in different global locations (as described further below), the system can nevertheless be treated as a single entity with one instance of a bidder for the purpose of modulating the bid price. Thus, the present system makes it unnecessary for each bidder instance to maintain its own accounting of spend while waiting for the update of batch data subsystems—a configuration that is subject to issues arising from the vagaries of traffic distribution within a collection of bidders (a data center) and traffic shifts across redundant data centers due to outages. The present control system can be configured to send a bid price modifier to all bidders equally and can be updated quickly, and therefore automatically adjusts to the traffic shifts and is agnostic to the distribution of bid requests to individual bidders within a data center.

In one implementation, the system provides a pull mechanism for pacing records. More specifically, the pacing record publisher can subscribe to the pub/sub and message queueing system (e.g., Kafka) in the streaming layer 110 and push the received records to bidders at a specified rate (e.g., T–60 seconds). Algorithms W, X, Y, and Z represent additional pacing controllers that can be implemented without impact or dependency on downstream components (e.g., pacing record publisher, bidder). In one implementation, one such algorithm is a bid price pacing algorithm such as that described in U.S. patent application Ser. No. 14/561,615, filed on Dec. 5, 2014, and entitled "Modulating Budget Spending Pace for Online Advertising Auction by Adjusting Bid Prices," the entirety of which is incorporated by reference. In another implementation, another algorithm includes a day part optimization algorithm that examines historical conversion data and weights an advertising budget across different hours of the week according to their respective conversion rates. Other configurations of the system are contemplated.

Figure 3:
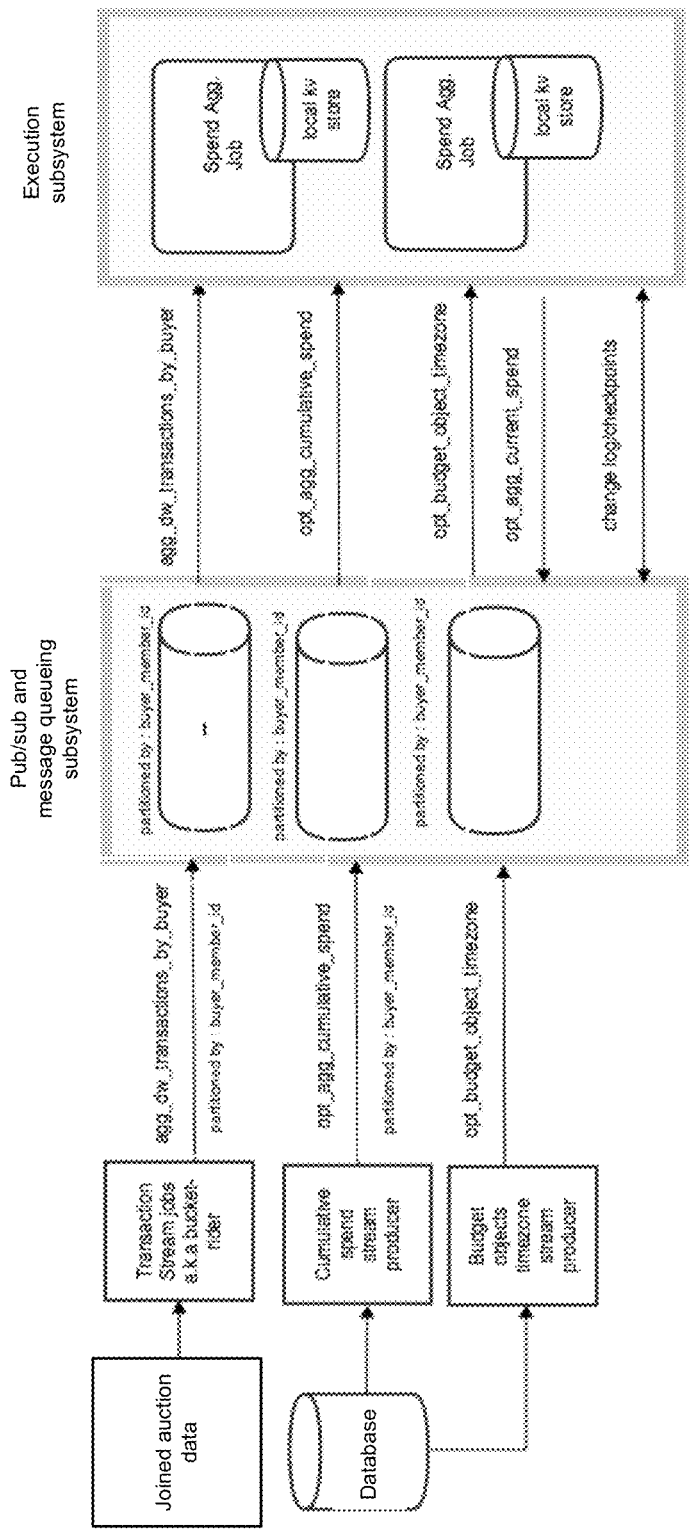
FIG. 3 depicts an example data layer of a stream processing system according to an implementation.

FIG. 3 depicts an example data layer of the stream processing system. To reduce the latency and enable a quick feedback loop from pacing controller to bidder, Lambda architecture-based data processing can be used. The data layer can create data streams (opt_agg_cumulative_spend and opt_agg_budget_object_timezone) from batch-retrieved data stored in a database (e.g., cumulative spend data, budget, time zone information, and other data as described below) and combine them with a real-time transaction stream (agg_dw_transactions_by_buyer) to compute current spend for advertising objects or elements (campaign, advertiser, etc.) as of a particular time. A Spend Aggregation job (in the format of, e.g., an Apache Samza job) is then created at the execution subsystem that consumes the agg_dw_transactions_by_buyer and opt_agg_cumulative_spend streams to aggregate the cumulative spend, booked revenue and delivered impressions for the objects and streams the results to the pub/sub subsystem periodically (e.g., every 10 seconds).

The Spend Aggregation job can use a local key-value (kv) store to aggregate cumulative spend, booked revenue, and delivered impressions by an object identifier and/or object type. As one example, the job can maintain three tables in the key-value store: (1) current day cumulative spend, (2) current hour spend, and (3) previous hour spend. Periodically (e.g., every five seconds), the job merges the spend data from the three tables and writes a message with data on current spend (opt_agg_current_spend) to the message queuing subsystem. When hourly spend data is available, a cumulative spend stream producer job can aggregate the spend, booked revenue, and impressions for the current day (at campaign, campaign group and insertion order) and publish a message with cumulative spend data (opt_agg_cumulative_spend) to the messaging queue subsystem. This job consume three streams: (1) the transaction stream (agg_dw_transactions_by_buyer), which is fed by the real-time processing system, (2) the cumulative spend stream (opt_agg_cumulative_spend), and the object level time zone stream (opt_budget_object_timezone), the latter two of which can be fed by Vertica stream producers from batched data. Object level time zone is used to report the metrics at object local time zone scope. Settings for message priority can be enabled to prioritize the real-time stream over the batch stream, so that the real-time processing doesn't slow down if there is a sudden burst of data on the batch stream.

Figure 4:
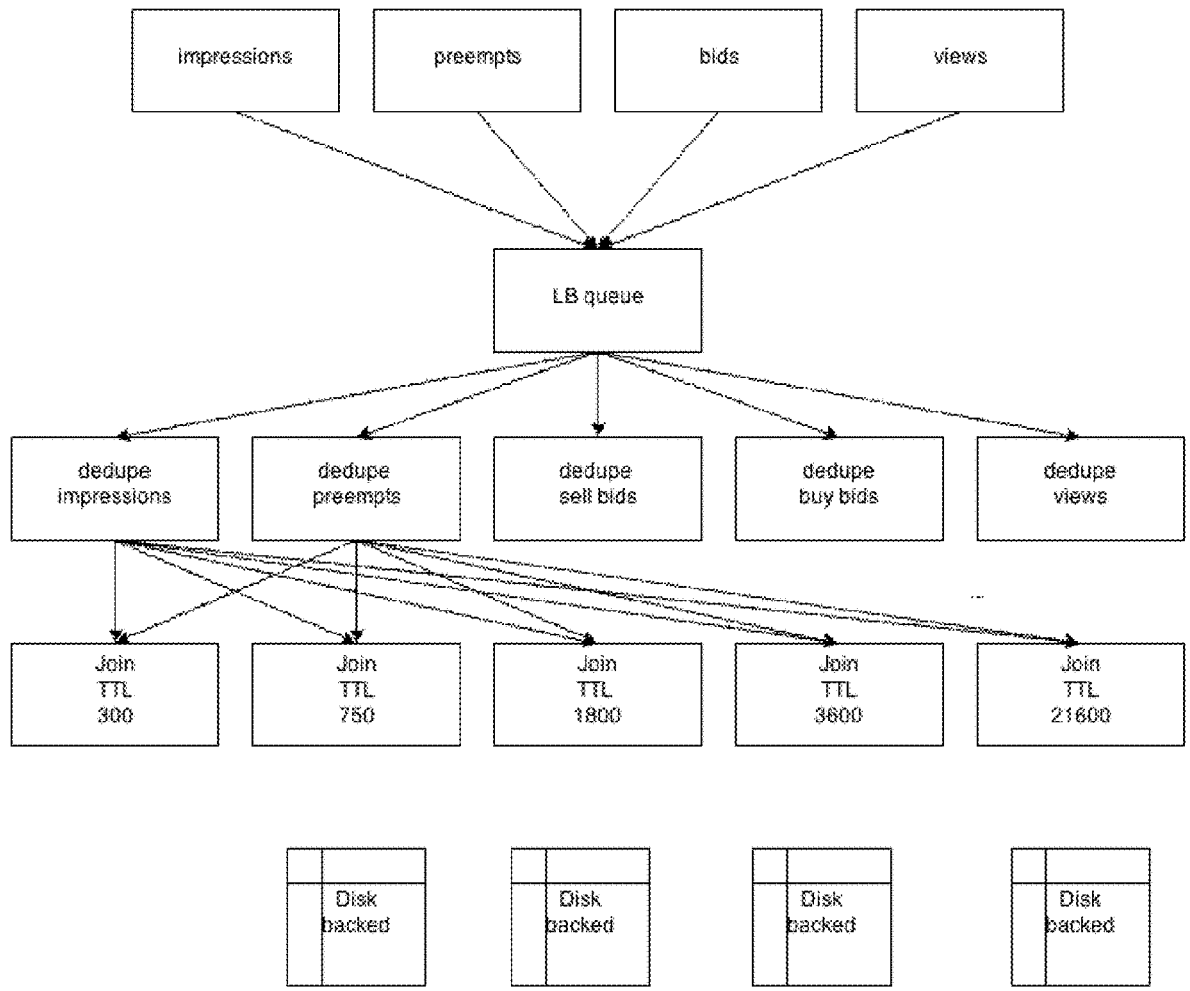
FIG. 4 depicts a logical view of real-time structured object data aggregation using join scripts according to an implementation.

The real-time transaction stream includes joined auction data from a complex event processor that provides real-time structured object data aggregation. FIG. 4 depicts a logical view of real-time structured object data aggregation using join scripts. Joined data can relate, for example, to impressions, preempts, bids, and/or views. In one implementation, these scripts perform data joining as follows.

Rows of data are received at instances of the complex event processor and are routed to a load balancing queue to enable better utilization of available processing resources. Each table is written into a de-duplication queue where the rows are de-duped based on a unique identifier (e.g., a 64-bit identifier associated with an online advertising auction). Rows that pass the dupe check (non-dupes) have their time-to-live (TTL) field read and are routed to another script layer based on the incoming TTL. Rows with the same TTL will arrive at the same TTL layer together. Each TTL script layer can have a time-limited (e.g., 300 second) in-memory join, so as to avoid writing every single row to disk. For a 300-second TTL, rows are evicted after 300 seconds and flow back to data storage. For a higher TTL threshold (e.g., 750 seconds and upwards), unjoined rows are written to disk. If a full join occurs before the TTL expires, the rows are flushed at the time of the full join. Otherwise, the rows are flushed when TTL expires. The TTLs in FIG. 4 (300, 750, 1800, and so on) are in seconds.

Online display advertising delivers promotional messages to consumers by using visual advertisements (or "ads") in web pages. A publisher of a web page can insert an ad space in the web page. When the web page is displayed in a browser, a visual advertisement (a "creative") of an advertiser can be dynamically retrieved from an ad server for the advertiser, and displayed in the ad space. The act of displaying or serving a creative on a web page is often referred to as an impression.

An ad inventory is a collection of one or more ad spaces on web pages served by a publisher's web sites. Publisher can sell their ad inventories to advertisers. Multiple publishers and multiple advertisers can participate in auctions in which selling and buying of ad inventories take place. Auctions can be conducted by an ad network or ad exchange that brokers between a group of publishers and a group of advertisers.

Selling and buying ad spaces can be based on pricing or payment models such as cost per thousand impressions (CPM), cost per click (CPC), and cost per action or acquisition (CPA). In the CPM model, advertisers typically pay for every impression of their advertisement, the price paid for each impression is measured in price per 1000 ("mille") impressions. In the CPC model, advertisers typically pay each time a viewer clicks on their advertisement. In the CPA model, advertisers pay for every action, such as a sale or registration, completed as a result of a viewer clicking on their advertisement.

A success event from an impression can be a click event, a click-through event (e.g., an action after a click event), or a view-through event (e.g., an action after viewing an impression). Other success events are possible. A success event from an impression can indicate an ad buyer's own web content (e.g., a landing page for a click event) is consumed by the viewer of the impression, or actions desired by the buyer is taken by the viewer. For instance, the viewer can take actions such as joining a mailing list, creating an account, completing a survey, purchasing an item, saving an item to a wish list, sharing content on a landing page to a friend, subscribing to a web feed, and so on. For a buyer of ad inventories, it is often desirable to pay for lowest possible price per success event, or lowest possible CPA or CPC, for a given budget. For a buyer of ad inventories, it can also be desirable to pay for lowest possible price per impression, or lowest possible CPM, to attract more "eyeballs" on the buyer's ads for a given budget, for example.

A buyer of ad inventories can optimize the results from ad spaces the buyer purchases by adjusting bid prices on different ad inventories. For instance, to optimize for more success events, a buyer can bid with a higher bid price for an ad inventory that can potentially (e.g., based on historical data) generates more success events per impression, and bid with a lower bid price for another inventory that may potentially generates less success events per impression. Meanwhile, bidding on ad inventories can be constrained by budgets (e.g., a daily budget) available to the buyer.

Ordinarily, a buyer can limit ad spending within a budget by limiting the time or the number of ad inventories to bid on. For instance, the buyer can bid on ad inventories during a day (e.g., starting 7 o'clock in the morning) until all available daily budget is spent. The buyer can also spread out ad buying throughout a day by bidding on ad inventories in intervals. For instance, the buyer can bid on ad inventories for a 20-minute window every hour such that the ad buying can fit into the daily budget limit. However, the buyer misses out on ad inventories that may provide good return (e.g., higher number of impressions or success events per unit cost) but fall outside the bidding windows.

Figure 5:
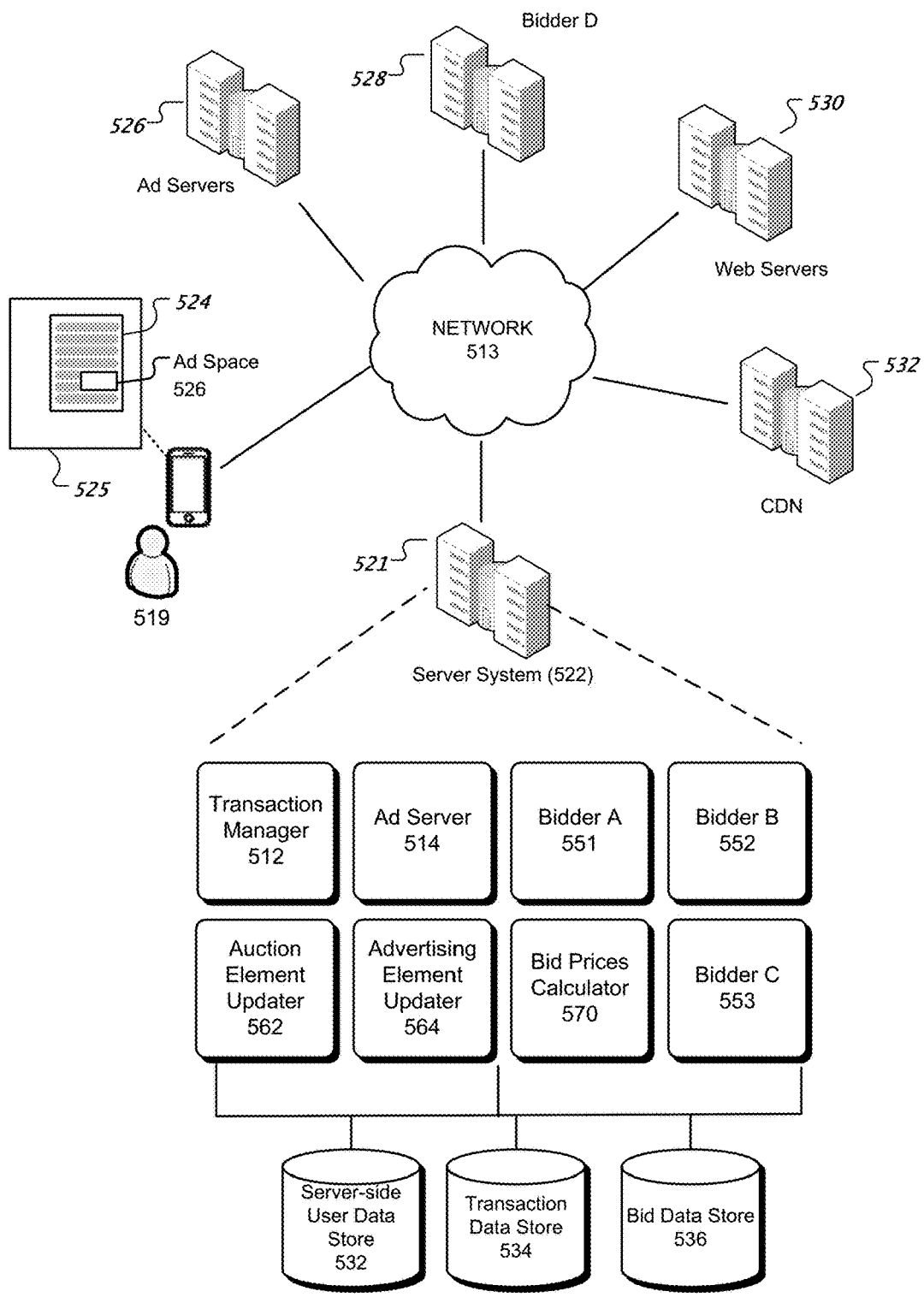
FIG. 5 depicts an example system for adjusting the of resource exhaustion according to an implementation.

FIG. 5 illustrates an example system for adjusting bid prices for online advertising auctions using the stream processing architecture described herein. A server system 522 provides functionality for adjusting bid prices for online advertising auctions. The server system 522 comprises software components and databases that can be deployed at one or more data centers 521 in one or more geographic locations, for example. The server system 522 software components comprise a transaction manager 512, ad server 514, and one or more bidders (e.g., bidder A 551, bidder B 552, bidder C 553). The server system 522 software components also comprise an auction element updater 562, advertising element updater 564, and bid prices calculator 570. The server system 522 can also include one or more software components for load balancing tools and security tools. The load balancing tools manage traffic within a single data center or between multiple data centers. The security tools manage data protection and access privilege for tenants served by the data centers 521. The software components can comprise subcomponents that can execute on the same or on different individual data processing apparatus. The server system 522 databases comprise a server-side user data store database 502, transaction data store database 534, and bid data store database 536. The databases can reside in one or more physical storage systems. The software components and data will be further described below.

The transaction manager 512 ("impression bus" or simply "Imp Bus") is a software component that facilitates the transaction aspects of ad inventory trading between buyers and sellers. A buyer can be an advertiser (e.g., a credit card company, a sportswear company), an ad network, or an advertising agency, for example. Other buyers are possible. A seller can be a publisher (e.g., newspaper or social network), an online streaming or gaming service, or an ad network. Other sellers are possible. The transaction manager 512 processes ad requests received from browsers displaying content from publishers, feeds data to advertisers, conducts auctions (e.g., on behalf of sellers), returns creatives to the browsers, keeps track of billing and usage for advertisers and publishers, returns auction-result data, and enforces quality standards, for example. The transaction manager 512 stores in the transaction data store database 534 various transaction information for each and every ad space that is transacted by the transaction manager 512 or other software components of the server system 522.

The ad server 514 is a software component that serves ads or creatives to web pages. The ad server 514 can also make decisions about what ads to be served, track clicks on ads and other data, for example.

A bidder system or bidder (e.g., bidder A 551) is a software component that, on behalf of a buyer, performs bidding operations. The bidder takes various pieces of bid-specific information (e.g., maximal bid price, target user areas or segments, start and end dates, budget) as input and generates a bid for a particular item of an ad space inventory, for example. A buyer can set up (e.g., through an API or web pages provided by the server system 522) a campaign targeting an ad space inventory with a set of bid-specific information for the ad space inventory and store the bid-specific information in bid data database 536. In some implementations, a bidder can be remote from the server system 522, such as bidder D 528. Here, an ad space inventory can be a collection of one or more ad spaces on web pages served by a publisher's web site. An ad space inventory can also be a collection of one or more ad spaces in user interfaces presented by a software application published by a publisher. Other collections of ad spaces of an ad space inventory are possible.

The transaction manager 512 conducts an auction when receiving an ad request for filling an available ad space. By way of illustration, a graphical user interface 524 of a software application 525 executing on client device 520 of a user 519 can include an ad space 526 and a corresponding ad tag. The application 525 can be a web browser application, or a software application such as a game application or a maps application. For instance, a web page displayed in a browser window of a web browser (e.g., running on a personal computer) can include an ad space on the web page and a corresponding ad tag. By way of illustration, the ad space can appear at the bottom of the user interface (a "banner ad") with a corresponding ad tag. Other examples of ad spaces are possible. Here, the client device 520 can be a mobile phone, a smartwatch, a tablet computer, a personal computer, a game console, or an in-car media system. Other examples of a client device are possible.

In some implementations, an ad tag comprises a Uniform Resource Locator (URL) from which an ad will be requested (e.g., a URL for the server system 522), Hypertext Markup Language (HTML) statements and/or JavaScript instructions for retrieving and displaying a creative (e.g., displaying the creative in a 160×600 iframe). The application 525 running on the client device 520 can retrieve content in the user interface 524 (e.g., a web page) through one or more data communication networks 513 such as the Internet, for example, from web servers 530 of a publisher. The ad tag causes the application 525 to send (e.g., through the networks 513) an ad request ("ad call") to the server system 522. In some implementations, the application 525 sends an ad request to the server system 522 via another advertising server system such as an ad exchange. The ad request can include information about the available ad space 526 (e.g., a size for the ad space, an identifier for the publisher), user information (e.g., an identifier of the user 519, an Internet Protocol or IP address), and system information (e.g., types of the browser and the client device), for example. The ad request can be composed in JavaScript Object Notation (JSON) or Extensible Markup Language (XML) format and transmitted to the server system 522 using Hypertext Transfer Protocol (HTTP) protocol (e.g., using HTTP POST request method). Other ad request formats and transmission methods are possible.

In response to the ad request, the transaction manager 512 generates a bid request including information about the ad space, the user, and so on, and sends the bid request to multiple bidders such as bidder A 551 and bidder B 552. The transaction manager 512 can also send the bid request through the networks 513 to servers of bidder D 528, which is external to the server system 522. The bid request can be composed in JSON format and sent to bidders using HTTP POST. The bid request can also be encoded or compressed. Other bid request formats and transmission methods are possible.

Each bidder can determine an appropriate bid based on its own requirements (e.g., budget, targets in placements) and submit a bid response including a bid price and an identifier of a creative to be served, for example, to the transaction manager 512 (or not to respond at all). The transaction manager 512 determines a winning bid (e.g., a highest bid) among bid responses received within a specified time period (e.g., 100 milliseconds). The transaction manager 512 then returns a creative of the winning bid to the client device 520, causing the application 525 to display the creative in the ad space in the user interface 524. The transaction manager 512 can also return a URL for a creative of the winning bid to the client device 520, causing the application 525 on the client device 520 to retrieve the creative from an ad server (e.g., ad server 514, or ad servers 527 external to the server system 522), or from servers of a content distribution network (CDN) 531. In various implementations, the transaction manager 512 can store in the transaction data database 534 transaction information such as an identifier of the creative served to the ad space, an identifier of the winning buyer, the user's identifier, the winning bid price, an identifier of the ad space, an identifier of the seller of the ad space, and a time stamp. The winning bid price (i.e., the price paid by the winning buyer) can be the bid price submitted by the winning buyer, or a second highest bid price of the auction as determined by Vickrey auction or other second-price auction mechanisms. Other transaction information of a transaction is possible.

The auction element updater 562 is a software component that identifies an auction element for an auction. An auction element can be an ad inventory—i.e., a collection of one or more ad spaces on one or more web pages. An auction element can also be one or more ad spaces within user interfaces of one or more software application (e.g., a game application). Other collections of ad spaces for auction elements are possible.

By way of illustration, an auction element can comprise a collection of one or more ad spaces (e.g., identified by ad tags) on web pages served by a seller's web site. The seller can group a set of web pages by its liking for an auction, as the seller may have the best understanding of web pages on its web properties. For instance, the seller can group a particular set of web pages related to basketball (e.g., from websites covering scores and news of basketball games) for an auction. This particular set of web pages (a "placement group") can offer a better targeting of impression viewers who are interested in basketball or sports (e.g., for an advertiser of sporting goods), and potentially has higher success rate from impressions on this particular set of web pages. The seller can submit an auction element to the transaction manager 512 (or another software component of the server system 522) via an auction element application programming interface or API, causing the transaction manager 512 to store the auction element in the bid data store database 536, for example. The auction element updater 562 can identify an auction element by listening to the auction element API, or periodically check the bid data store database 536, for new auction elements.

As for another example, the auction element updater 562 can access the bid data store database 536 for ad spaces from one or more sellers, and group the ad spaces into auction elements. Each auction element (a "venue") can have similar attributes (e.g., user target geographical area, domain, application, and so on). The auction element updater 562 can also group ad spaces into auction elements such that each auction element has similar historical performance characteristics (e.g., similar numbers of impressions for a unit time, or similar CPM, CPC, or CPA).

The advertising element updater 564 is a software component that identifies a plurality of advertising elements that will bid on auction elements. An advertising element or line item includes one or more advertising campaigns for an advertiser (a buyer). A line item can be a financial agreement with an advertiser that includes effective start and end dates ("flight dates") and a budget (e.g., lifetime budget, daily budget). A line item can also include performance goals (e.g., based on CPC or CPA payment model) that can be used to determine whether or not to bid on an ad inventory. A line item can also include one or more conversion pixels that are used to track revenue or performance goals. A line item can also include targets such as devices (e.g., desktop and laptop computer, tablet computer), placements (e.g., desktop and laptop web page, mobile web page, mobile application), domains (e.g., web domains, mobile applications, websites), user geographic areas, or user systems (e.g., carriers, operating systems, browsers, devices). Other line item targets are possible. A line item can also include on or more creatives.

Each advertising campaign of a line item includes a set of creatives that promote an idea, theme, product, or brand (e.g., a children's brand, a healthy lifestyle, a new car model). Similarly to a line item, an advertising campaign can include flight dates and a budget. An advertising campaign also includes one or more payment types (e.g., CPC, CPM, CPA) and bidding instructions (e.g., a bid price) on ad inventories, and one or more creatives. An advertising campaign can also include targets in devices, placements, domains, user geographic areas, user systems. An advertising campaign can have more granular controls in targeting than a line item, such as targets in inventory segments (e.g., automobiles, home and garden, sports), publishers, and user segments (e.g., demographics). Other advertising campaign targets are possible.

In some implementations, a line item may have precedence over its advertising campaigns. For instance, an advertising campaign cannot bid after its parent line item's flight dates had expired. In some other implementations, an advertising campaign may have precedence over its parent line item. For instance, if an advertising campaign's user target geographic area is smaller than but is part of the user target geographic area of its parent line item, the advertising campaign will bid only within its own user target geographic area. In yet some other implementations, an aggregation of targets or creatives of a line item and its advertising campaigns can be used to bid on an auction element or ad inventory.

A buyer (e.g., an advertiser or an ad network) can submit a line item including one or more advertising campaigns to a bidder (e.g., bidder A 551) through a line item API, causing the bidder to store the line item in the bid data store database 536. The advertising element updater 564 can identify new line items by listening to the line item API, or periodically check the bid data store database 536 for new line items.

The bid prices calculator 570 is a software component that calculates, for a line item (an advertising element), bid prices to bid one different auction elements. The bid prices calculator 570 is described in further detail below in reference to FIG. 6.

Figure 6:
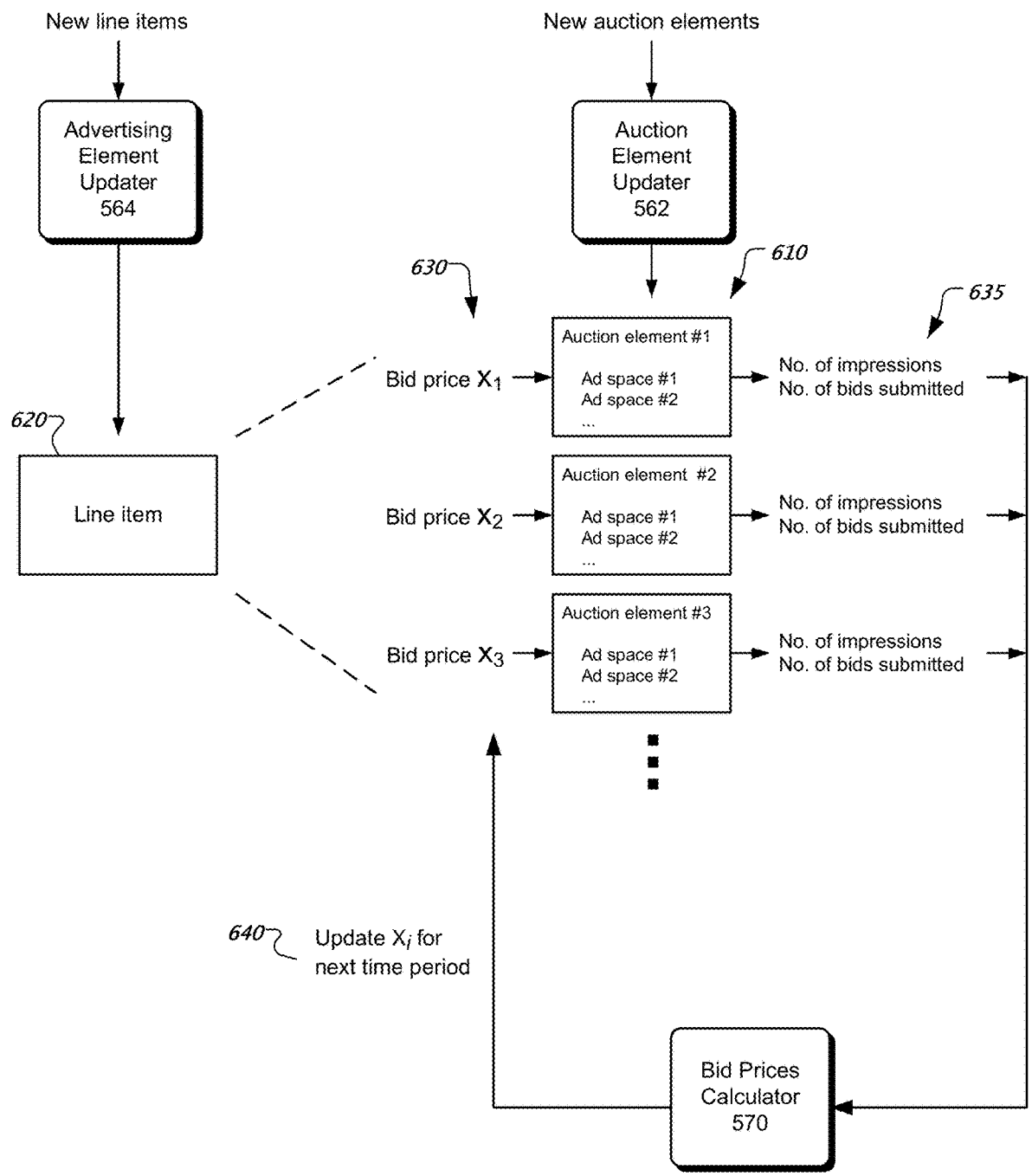
FIG. 6 is an example data flow diagram according to an implementation.

FIG. 6 is an example data flow diagram for the system illustrated in FIG. 5. The auction element updater 562 obtains a plurality of auction elements 610 (e.g., auction element #1, auction element #2, auction element #3, and so on). Each auction element comprises one or more ad spaces.

The advertising element updater 564 receives a new line item 620 (e.g., from an ad buyer or and ad network). The line item 620 comprises one or more advertising campaigns, and a budget (e.g., a daily budget, or lifetime budge). Each advertising campaigns comprises one or more creatives. Here, let $x_i$ denote the line item's bid price for ad spaces of the i-th auction element, and let that there are n total auction elements: i=1, 2, . . . , n. A bidder (e.g., bidder A 551) can submit respective bid prices $x_i$ (630) to bid on the auction elements 610. Each bid price $x_i$ can be specific to a particular campaign and creative of the line item.

How much the line item can bid on the auction elements—i.e., the bid prices $x_i$, is limited by available budget of the line item. Here, let S denote a budget spending pace, or a budget to be spent during a time period. S can be a number of impressions that the line item won bidding during the time period. In some implementations, S can be the total media cost (the sum of second price bids paid) for bids won during the time period.

Let $E_i$ denote the number of ad spaces of the i-th auction element that are available for the line item to bid for a unit of time. Let $F_i(x_i)$ denote a win curve—i.e., a probability that the bid price $x_i$ would be the winning bid for a given ad space of the i-th auction element. Let $v_i$ denote an expected value of an impression for the line item on the i-th auction element—i.e., a probability of a success event from the impression, multiplied by a value of the success event (e.g., a price paid by an advertiser for the success event). Let $c_i$ denote an expected cost of an impression on the i-th auction element given the bid price $x_i$. Assuming second-price auctions are conducted on the auction elements, the expected cost of an impression on the i-th auction element $c_i$ is the expected highest competing bid if the line item wins the auction for the i-th auction element.

Optimizing the total (expected) revenue for the line item can be represented as maximizing the following utility function $$\sum_{i=1}^{n} E_i \cdot F_i(x_i) \cdot (v_i \cdot c_i(x_i)) \qquad (1)$$

subject to a constraint in how much the line item can bid on the auction elements:

$$\sum_{i=1}^{n} E_i \cdot F_i(x_i) = S \qquad (2)$$

Solving the above optimization problem can be equivalent, based on the method of Lagrange multipliers, to optimizing the follow:

$$\Lambda(x_1, x_2, \ldots, x_n, \lambda) = \sum_{i=1}^{n} E_i \cdot F_i(x_i) \cdot (v_i - c_i(x_i)) - \lambda \left( \sum_{i=1}^{n} E_i \cdot F_i(x_i) - S \right) \quad (3)$$

for a multiplier $\lambda$. In a second-price auction, the cost of an impression is the second highest bid made, and thus the expected cost on an impression for a given bid price is the expected value of the second highest bid when the given bid price wins the auction. In other words, $c(x)=E[y|y<x]$, where $y$ is the highest competing bid. By definition, $$E[y \mid y < x] = \int_0^x y \cdot Pr(y \mid y < x) dy \quad (4)$$

By Bayes' theorem, $$Pr(y \mid y < x) = \frac{Pr(y < x \mid x) \cdot Pr(y)}{Pr(y < x)} \quad (5)$$

Here, $Pr(y<x|y)$ is 0 if $y \geq x$, and 1 if $y<x$. Here, let $f$ denote the derivative of $F$. Thus $Pr(y)=f(y)$, and $Pr(y<x)=F(x)$. Therefore, $$c(x) = \int_0^x y \frac{f(y)}{F(x)} dy = \frac{1}{F(x)} \int_0^x y f(y) dy \quad (6)$$

Thus for second-price auctions, the derivative of $F_i(x_i) \cdot c_i(x_i)$ is $f_i(x_i) \cdot x_i$, wherein $f_i(x_i)$ is the derivative of $F_i(x_i)$. Taking partial derivatives and setting them equal to zero yields the following $$E_i \cdot f_i(x_i) \cdot (v_i - x_i) - \lambda \cdot E_i \cdot f_i(x_i) = 0 \quad (7)$$

for each i-th auction element. Thus each bid price $x_i$ can be:

$$x_i = v_i - \lambda \quad (8)$$

As shown in the above equation, a bid price for a particular auction element can be higher if the particular auction element is more valuable, or has a higher expected value. The expected value for the particular auction element $v_i$ can be determined by historical data. For instance, the expected value can be an average of past revenue generated from impressions on ad spaces of the particular auction element.

Instead of calculating the multiplier $\lambda$ deterministically, the bid prices $x_i$ can be calculated iteratively. More particularly, a bidder may submit the bid prices $x_i$ to respective auction elements for a first time period. The bidder (or other software components of the server system 522) can determine, for each auction element, the number of bids submitted during the first time period and the number of impressions served by creatives of the line item (i.e. bids won by the line item) during the first time period (635). Based on the number of bids submitted and the number of impressions served, the bid prices calculator 570 can determine an actual budget spending pace for the first time period. The bid prices calculator 570 can update the bid prices for the auction elements, for a second time period after the first time period (640), based on a target budget spending pace for the second time period ($\tilde{S}$), the actual budget spending pace for the first time period (S), and the bid prices for the first time period ($x_i$).

By way of illustration, the bid prices calculator 570 can update the bid prices for the second time period (after the first time period) by an adjustment amount $\delta$:

$$\lambda := \lambda - \delta \quad (9)$$

or $$x_i := x_i + \delta \quad (10)$$

The adjustment amount $\delta$ can be determined as follows:

$$\text{If } \bar{x} > 0 \text{ and } W > 0 : \delta = \bar{x} \cdot \frac{\tilde{W} - W}{W(1 - W)} \quad (11)$$

$$\text{else } \delta = \tilde{W} - W$$

with the following constraint:

$$\delta = \min\left( \max\left( \delta, -\frac{\bar{x}}{2} \right), \bar{x} \right) \quad (12)$$

Here, W is the actual win rate, or actual spending pace S divided by a total number of bids submitted by the line item, for the first time period. $\tilde{W}$ is the target win rate, or the expected spending pace $\tilde{S}$ divided by a total number of ad spaces available for the line item to bid, for the second time period. The total number of ad spaces available for the line item to bid during the second time period can be assumed to be the same as the total number of bids submitted by the line item during the first time period. $\bar{x}$ is the average bid price for the first time period. Here, the highest competing bids is assumed to have a log-logistic distribution. The actual win rate W could be zero if all bids are too low to win any auction.

In another implementation, the adjustment amount $\delta$ can be determined as follows:

$$\delta = \bar{x} \cdot \frac{\tilde{S} - S}{\tilde{S} \log \tilde{W}} \text{ if } \tilde{S} \geq S \quad (13)$$

$$\delta = \bar{x} \cdot \frac{\tilde{S} - S}{S \log \tilde{W}} \text{ if } \tilde{S} < S$$

Here, the win curve $F_i(x_i)$ is assumed to have a log-Gumbel shape.

In yet another implementation, the adjustment amount $\delta$ can be determined as follows:

$$\delta = -\left( \frac{\tilde{S}}{S} - 1 \right) \cdot \bar{x} \quad (14)$$

Here, the win curve $F_i(x_i)$ can be assumed to be approximately linear, and zero when a bid price for a particular auction element is 0. $\bar{x}$ is the average bid price for all auction elements.

The frequency to update bid prices (by the adjustment amount δ) can be based on one of the two conditions below:

$$\text{impressions} \geq r \cdot B \quad (15)$$

$$\text{available\_ad\_spaces} \geq \frac{r \cdot B}{\bar{W}} \quad (16)$$

Here, B is the total budget. r is a given portion of the total budget (e.g., one percent of the total budget). The bid prices calculator 170 can update with a new set of bid prices when the number of impressions (i.e., bids won) has reached the given portion of the total budget in the current iteration, or when the given portion of the total budget should have been spent in the current iteration.

The target spending pace $\tilde{S}$ can be derived as the remaining available budget R over the remaining lifetime (or time period) of the budget h:

$$\tilde{S}(t) = \frac{R(t)}{h(t)} \quad (17)$$

For instance, if the remaining daily budget is $600 at noon, then the budget spending pace can be $50 per hour. In some implementations, the budget spending pace S can depend on time of the day. For instance, if the remaining daily budget is $600 at noon, then the budget spending pace can be $37.5 per hour for the rest of the day, except between 7 to 11 o'clock in the evening (e.g., when people may go online more often), the budget spending pace is $75 per hour.

The bid prices calculator 570 can optimize toward a higher number of success events from impressions won by the line items (i.e., higher total revenue), or toward a higher margin from impressions won by the line items, by adjusting the expected value of an impression for the line items on the i-th auction element $v_1$ as follows:

$$x_i = \alpha \cdot v_i - \lambda \quad (18)$$

Here, the parameter α (a lever or bias) can be greater than or equal to 0. When α is 1, the calculated bid prices are the same as above for optimizing a total revenue for the line item, thus enabling a higher number of success events from impressions served by creatives of the line item. When α is 0, all available ad spaces are bid on with the same bid price (regardless respective expected values) that can enable higher margin by buying more impressions from auction elements with lower expected values, and buying less impressions from auction elements with higher expected values.

When the parameter α is greater than 1, auction elements (or ad spaces) with higher expected values can be bid with bid prices higher than respective expected values, thus even more bias is given to the auction elements with higher expected values.

In some implementations, the bid prices calculator 570 can calculate bid prices for minimizing the overall media cost (bid prices paid) for a success event, or equivalently, for maximizing overall conversions (from impressions to success events) subject to a budget constraint in media cost. The bid prices calculator 570 can calculate bid prices for maximizing overall conversions subject to a budget constraint in media cost based on an expected number of success events from impressions on ad spaces of each auction element. Here, let $p_i$ denote the probability of a conversion for a given impression on the i-th auction element. $p_i$ is an expected number of success events on impressions served by creatives of the line items on the i-th auction element. Maximizing overall conversions for the line item can be represented by the following utility function:

$$\sum_{i=1}^{n} E_i \cdot F_i(x_i) \cdot p_i \quad (19)$$

subject to the constraint as follows:

$$\sum_{i=1}^{n} E_i \cdot F_i(x_i) \cdot c_i(x_i) = S \quad (20)$$

Assuming a second-price auction and the expected cost on an impression for a given bid price $c_i(x_i)$ being the expected value of the second highest bid when the given bid price wins the auction as described earlier, and applying the method of Lagrange multipliers, the optimal bid price can be:

$$x_i = \frac{p_i}{\lambda} \quad (21)$$

Note that the bid price is higher when the auction element has higher probable conversion rate. The multiplier λ (thus the bid prices $x_i$) can be adjusted for a second time period after a first time period, as follows:

$$\lambda := \lambda - \lambda \cdot \frac{\tilde{S} - S}{\tilde{S}} \quad \text{if } \tilde{S} \geq S \quad (22)$$

$$\lambda := \lambda - \lambda \cdot \frac{\tilde{S} - S}{S} \quad \text{if } \tilde{S} < S$$

or equivalently:

$$\lambda := \lambda \cdot \frac{S}{\tilde{S}} \quad \text{if } \tilde{S} \geq S \quad (23)$$

$$\lambda := \lambda \cdot \left(2 - \frac{\tilde{S}}{S}\right) \quad \text{if } \tilde{S} \geq S$$

As described earlier, $\tilde{S}$ is the target budget spending pace for the second time period. S is the actual budget spending pace for the first time period.

In various implementations, when the total budget (e.g., total daily budget) is fixed (e.g., pre-determined), the bid prices calculator 570 can adjust a bid price $x_i$, for example, by iteratively updating the Lagrange multiplier λ in the above formula (8) as follows:

$$x_i = v_i - \lambda \quad (24)$$

$$\lambda_t := \lambda_{t-1} - \theta$$

$$\theta = \beta \cdot \bar{x} \cdot \frac{u}{B}$$

Here, θ is an update to the Lagrange multiplier λ after every iteration. For instance, the Lagrange multiplier $λ_t$ at the current iteration is updated by subtracting θ from the Lagrange multiplier $λ_{t-1}$ of the prior iteration. β is a sensitivity parameter that can amplify or decrease an effect of the update θ on the Lagrange multiplier adjustment. $\bar{x}$ is the average bid price in the prior iteration. u is the difference between the target spending and actual spending (e.g., in dollars) during the prior iteration. B is the total daily budget (e.g., in dollars).

When minimizing the overall media cost which is the bid prices paid for success events, the bid prices calculator 570 can adjust a bid price $x_i$, for example, by iteratively updating the Lagrange multiplier λ as follows:

$$x_i = v_i * λ \quad (25)$$

$$λ_t := λ_{t-1} - γ$$

$$γ = \left(1 + \frac{u}{B}\right)$$

Here, γ is an update to the Lagrange multiplier λ for every iteration. For instance, the Lagrange multiplier $λ_t$ at the current iteration is updated by subtracting γ from the Lagrange multiplier $λ_{t-1}$ of the prior iteration. u is the difference between the target spending and actual spending (e.g., in dollars) during the prior iteration. B is the total daily budget (e.g., in dollars).

In various implementations, the bid prices calculator 570 can adjust a bid price $x_i$ to enable the actual spending (the total spending achieved so far) to closely track the target budget spending (on the i-th auction element), by providing feedback and minimizing an error between the actual budget spending and the target budget spending. As further described below, in this way, the actual spending can converge to the target spending, without the need to calculate the Lagrange multiplier λ based on the win rates as described in reference to formulas (8), (9), (11) and (13) above.

For instance, the bid prices calculator 570 can adjust the bid price $x_i$ at a time instance t from the bid price $x_i$ at a previous time instance (t−1) by a bid price multiplier Bm:

$$x_i(t) = Bm \cdot x_i(t-1) \quad (26)$$

$$Bm = K_1 \cdot e + K_2 \int e \, dt \quad (27)$$

Here, the error e is a percentage difference between the target spending (e.g., in dollars) and the actual spending (e.g., in dollars) at a given time instance. The integral $\int e \, dt$ can be performed from t=0 (the epoch time that the bid prices calculator 570 started tracking total spending) to t=now, during the time when the line item 620 is bidding on ad spaces of the i-th auction item, for example. For instance, if the bid prices calculator 570 tracks total spending of a daily budget of the line item 620 on the i-th auction item, the integral $\int e \, dt$ can be performed from 00:00 (midnight) to the current time. If the line item 620 is only bidding before and after commute hours (e.g., from 06:00 to 08:00, and from 18:00 to 20:00), then the integral $\int e \, dt$ can be performed only during these time periods.

The error e can be positive if the target spending is greater than the actual spending (i.e., under-spending). The error e can be negative if the target spending is less than the actual spending (i.e., over-spending). The error e can be zero if the target spending is equal to the actual spending (i.e., spending on target).

The unit-less coefficient $K_1$ can be used for adjustment to reduce a present value (at the time instance t) of the error e. The unit-less coefficient $K_2$ can be used for adjustment to reduce accumulative past values of the error e, for example, from t=0 to t=now as represented by the integral $\int e \, dt$. The coefficients $K_1$ and $K_2$ can be initialized to particular values and adjusted ("tuned") heuristically such that the bid price multiplier Bm does not over-correct the errors (e.g., due to integral windup), for example. For instance, the coefficients $K_1$ and $K_2$ can be adjusted heuristically using a Ziegler-Nichols method. Other methods for determining coefficients $K_1$ and $K_2$ are possible. For instance, the coefficients $K_1$ and $K_2$ can be determined empirically.

By way of illustration, assume that the bid prices calculator 570 tracks the actual spending of a daily budget from the time 00:00. The bid prices calculator 570 can update the bid price $x_i$ every minute by calculating the bid price multiplier Bm at the current time instance (e.g., at 14:00) and multiplying the bid price $x_i$ at one minute ago (e.g., at 13:59) by the calculated bid price multiplier Bm. The bid prices calculator 570 can calculate the bid price multiplier Bm at the current time instance by the summation of the product of $K_1$ and the error e at the current time instance, and the product of $K_2$ and the integral of the error e (integrating from 00:00 to the current time instance).

Figure 7A:
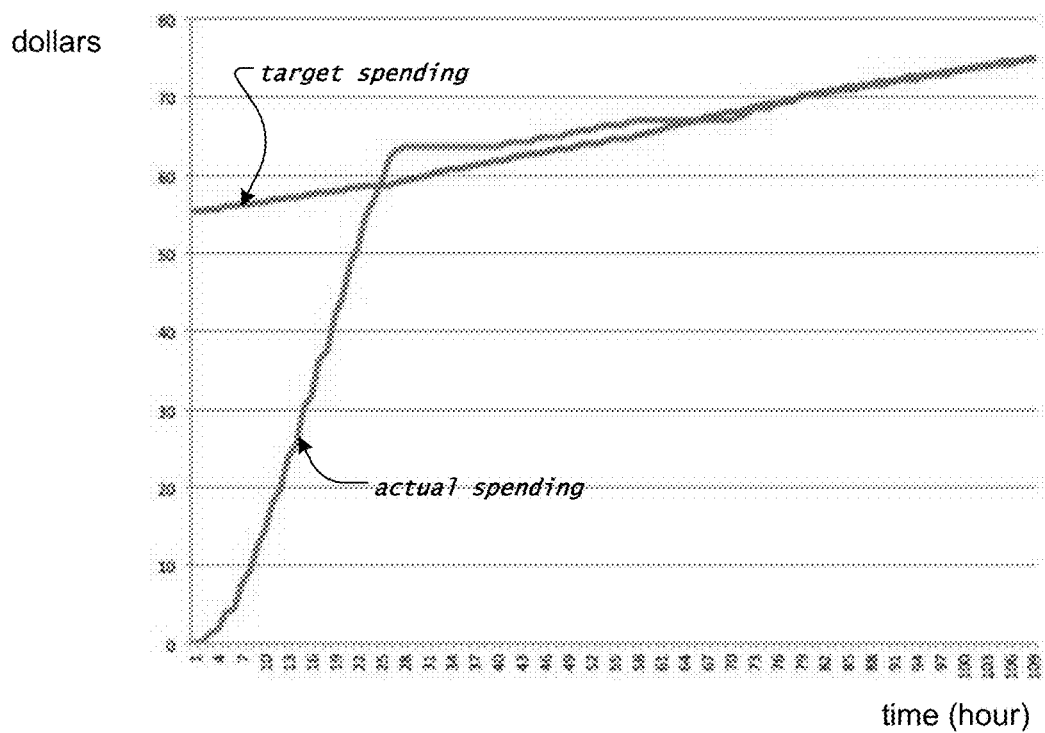
FIG. 7A is a diagram showing an example target spending and actual spending.

FIG. 7A is a diagram showing an example target spending and actual spending over time. The actual spending in FIG. 7A was adjusted over time by the bid price multiplier Bm shown in FIG. 7B. The bid price multiplier Bm is calculated with the coefficients $K_1$=2.0 and $K_2$=0.005.

Figure 7B:
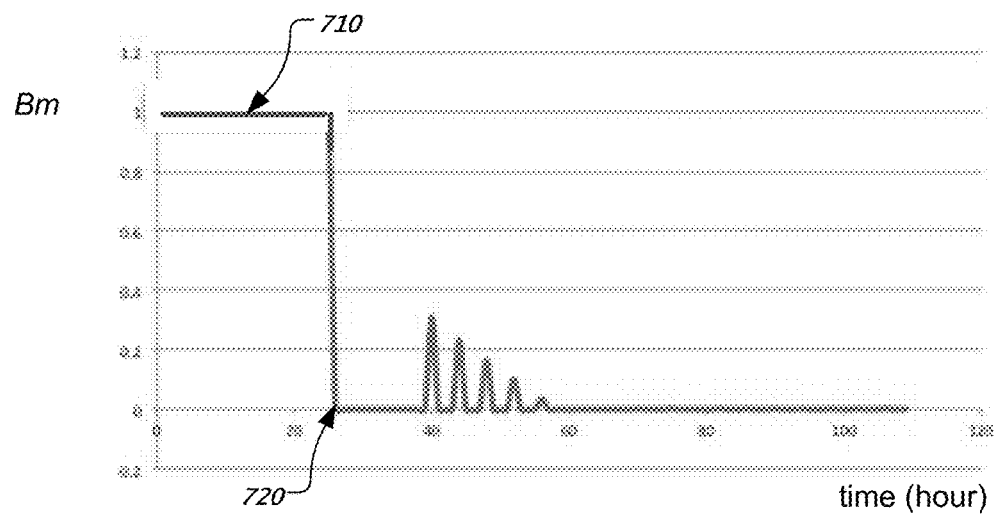
FIG. 7B is a diagram showing an example price multiplier.

As shown in the example of FIGS. 7A and 7B, the bid price multiplier Bm was maintained at 1.0 until the actual spending reached (and overshot over) the target spending level. Afterwards, the bid price multiplier Bm was close to 0.0, with some small "pulses" to adjust the actual spending level to match the target spending level.

In various implementations, the bid price multiplier Bm can be constrained such that the average value of the bid price multiplier Bm from t=0 to t=now is less than or equal to 1.0. In this way, problems with over-compensating errors in actual spending by the bid price multiplier Bm may be alleviated. Other methods for reducing over-compensating errors are possible. For instance, the bid prices calculator 570 can limit (cap) the bid price multiplier Bm to be at most equal to 1.0 (e.g., 710 in FIG. 7B). As for another example, the bid prices calculator 570 can set the bid price multiplier Bm to a small value or 0.0 (e.g., 720 in FIG. 7B) when the actual spending overshoots the target spending by at least a particular threshold (e.g., 2.5%).

In further implementations, the bid price multiplier Bm can exceed 1.0. Such higher multipliers can be used when, for example, a buyer is willing to sacrifice performance for delivery. By allowing the modifier to vary between 0 and a value higher than 1.0 (e.g., 1.5, 2.0, 3.0, or greater), the present system opportunistically shades bids when there is sufficient supply to meet demand, while allowing prices to float above the expected value when higher prices paid by other buyers prevent the buyer from meeting its delivery constraints.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
providing a stream processing system comprising (i) a publish/subscribe and message queueing subsystem and (ii) an execution subsystem;
receiving, at the publish/subscribe and message queueing subsystem, a real-time stream of transactions;
creating a job to aggregate data from the real-time stream of transactions with data from one or more other streams received at the publish/subscribe and messaging queueing subsystem;
executing the job at the execution subsystem and receiving the aggregated data resulting from the execution of the job at the publish/subscribe and message queueing subsystem;
providing at least a portion of the aggregated data as input to a control loop feedback process;
executing the control loop feedback process at a first time using the input and generating a result from the execution, wherein the result comprises a first target pace of resource exhaustion;
determining (i) an instant error between a target amount of resource exhaustion and an actual amount of resource exhaustion at a current time instance and (ii) an accumulative error between the target amount and the actual amount over a first time period;
adjusting (i) the instant error by a first weighting factor to generate an adjusted instant error and (ii) the accumulative error by a second weighting factor to generate an adjusted accumulative error, wherein the first weighting factor and the second weighting factor are selected to reduce over-correction associated with resource exhaustion; and
applying a second target pace of resource exhaustion during a second time period based on the adjusted instant error at the current time instance and the adjusted accumulative error over the first time period to reduce an instant error between the target amount of resource exhaustion and an actual amount of resource exhaustion during the second time period.

2. The method of claim 1, further comprising combining the adjusted instant error and the adjusted accumulative error to generate a bid price multiplier, wherein the control loop feedback process uses the bid price multiplier to generate bid prices for an auction.

3. The method of claim 1, wherein the execution subsystem comprises Apache HADOOP YARN, and wherein the publish/subscribe and message queueing subsystem comprises Apache KAFKA.

4. The method of claim 1, further comprising periodically creating and executing additional jobs to aggregate data received from the one or more other streams.

5. The method of claim 4, further comprising providing the first target pace and at least a portion of the aggregated data from the additional jobs as input to the control loop feedback process at the second time period to generate a second result comprising the second target pace.

6. The method of claim 5, wherein the second target pace is further determined based at least in part on a time of day of the second time period.

7. The method of claim 1, further comprising applying the first target pace during the first time period to determine a speed at which a resource will be exhausted.

8. A system comprising:
at least one memory for storing computer-executable instructions; and
at least one processor for executing the computer-executable instructions, wherein execution of the computer-executable instructions the at least one processor to perform operations comprising:
receiving, at a publish/subscribe and message queueing subsystem, a real-time stream of transactions;
creating a job to aggregate data from the real-time stream of transactions with data from one or more other streams received at the publish/subscribe and messaging queueing subsystem;

executing the job at an execution subsystem and receiving the aggregated data resulting from the execution of the job at the publish/subscribe and message queueing subsystem;

providing at least a portion of the aggregated data as input to a control loop feedback process;

executing the control loop feedback process at a first time using the input and generating a result from the execution, wherein the result comprises a first target pace of resource exhaustion;

determining (i) an instant error between a target amount of resource exhaustion and an actual amount of resource exhaustion at a current time instance and (ii) an accumulative error between the target amount and the actual amount over a first time period;

adjusting (i) the instant error by a first weighting factor to generate an adjusted instant error and (ii) the accumulative error by a second weighting factor to generate an adjusted accumulative error, wherein the first weighting factor and the second weighting factor are selected to reduce over-correction associated with resource exhaustion; and applying a second target pace of resource exhaustion during a second time period based on the adjusted instant error at the current time instance and the adjusted accumulative error over the first time period to reduce an instant error between the target amount of resource exhaustion and an actual amount of resource exhaustion during the second time period.

9. The system of claim 8, wherein the publish/subscribe and message queueing subsystem comprises Apache KAFKA.

10. The system of claim 8, wherein the execution subsystem comprises Apache HADOOP YARN.

11. The system of claim 8, wherein the operations further comprise periodically creating and executing additional jobs to aggregate data received from the one or more other streams.

12. The system of claim 11, wherein the operations further comprise providing the first target pace and at least a portion of the aggregated data from the additional jobs as input to the control loop feedback process at the second time period to generate a second result comprising the second target pace.

13. The system of claim 12, wherein the second target pace is determined based at least in part on a time of day of the second time.

14. The system of claim 8, wherein the operations further comprise applying the first target pace during the first time period to determine a speed at which a resource will be exhausted.

15. A non-transitory computer storage medium comprising instructions that, when executed by a processing apparatus, causes the processing apparatus to perform operations, the operations comprising:

creating a job to aggregate data from a real-time stream of transactions with data from one or more other streams;

executing the job and receiving the aggregated data resulting from the execution of the job;

providing at least a portion of the aggregated data as input to a feedback process;

executing the feedback process at a first time using the input and generating a result from the execution, wherein the result comprises a first target pace of resource exhaustion;

determining (i) an instant error between a target amount of resource exhaustion and an actual amount of resource exhaustion at a current time instance and (ii) an accumulative error between the target amount and the actual amount over a first time period;

adjusting (i) the instant error by a first weighting factor to generate an adjusted instant error and (ii) the accumulative error by a second weighting factor to generate an adjusted accumulative error, wherein the first weighting factor and the second weighting factor are selected to reduce over-correction associated with resource exhaustion; and applying a second target pace of resource exhaustion during a second, later time period based on the adjusted instant error at the current time instance and the adjusted accumulative error over the first time period to reduce an instant error between the target amount of resource exhaustion and an actual amount of resource exhaustion during the second time period.

16. The method of claim 1, wherein the executing of the job facilitates processing of advertisement requests received from browsers that display content from publishers, feeding data to advertisers, conducting an auction, returning advertisements to the browsers, tracking of billing and usage for the advertisers and the publishers, returning auction-result data, and enforcing a quality standard.

17. The method of claim 16, wherein the auction-result data comprises an indication of a bid for a particular item of an advertisement space inventory, and wherein the bid is based on a specification of a maximal bid price, target user areas or segments, start and end dates, and a budget.

18. The non-transitory computer storage medium of claim 15, wherein the executing of the job facilitates delivery of a uniform resource locator (URL) to a client device to cause an application on the client device to retrieve an advertisement specified by the URL from a server and display the advertisement in a user interface.

19. The non-transitory computer storage medium of claim 18, wherein the client device is one of a mobile phone, a smartwatch, a tablet computer, a personal computer, a game console, or an in-car media system.

* * * * *